United States Patent
Yu et al.

(10) Patent No.: US 10,454,167 B2
(45) Date of Patent: Oct. 22, 2019

(54) ANTENNA STRUCTURE

(71) Applicants: Yen-Hao Yu, Taipei (TW); Li-Chun Lee, Taipei (TW); Jui-Hung Lai, Taipei (TW); Shih-Chia Liu, Taipei (TW); Jhin-Ciang Chen, Taipei (TW); Chao-Lin Wu, Taipei (TW)

(72) Inventors: Yen-Hao Yu, Taipei (TW); Li-Chun Lee, Taipei (TW); Jui-Hung Lai, Taipei (TW); Shih-Chia Liu, Taipei (TW); Jhin-Ciang Chen, Taipei (TW); Chao-Lin Wu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 74 days.

(21) Appl. No.: 15/716,481

(22) Filed: Sep. 26, 2017

(65) Prior Publication Data

US 2018/0090840 A1  Mar. 29, 2018

Related U.S. Application Data

(60) Provisional application No. 62/401,831, filed on Sep. 29, 2016.

(51) Int. Cl.
*H01Q 1/24* (2006.01)
*H01Q 5/371* (2015.01)
(Continued)

(52) U.S. Cl.
CPC .......... *H01Q 5/371* (2015.01); *H01Q 1/2266* (2013.01); *H01Q 1/243* (2013.01); *H01Q 1/52* (2013.01);
(Continued)

(58) Field of Classification Search
CPC ...... H01Q 1/243; H01Q 5/371; H01Q 1/2266; H01Q 1/52; H01Q 5/50; H01Q 13/10; H01Q 21/30
See application file for complete search history.

(56) References Cited

U.S. PATENT DOCUMENTS

| 2013/0321216 | A1  | 12/2013 | Jervis et al. |
| 2015/0236422 | A1* | 8/2015  | You ........................ H01Q 7/00 343/729 |

(Continued)

FOREIGN PATENT DOCUMENTS

| CN | 104037492 | 9/2014 |
| TW | 201419663 | 5/2014 |

(Continued)

OTHER PUBLICATIONS

Office Action of Taiwan Counterpart Application, dated Oct. 30, 2018, pp. 1-5.

(Continued)

*Primary Examiner* — Dieu Hien T Duong
(74) *Attorney, Agent, or Firm* — JCIPRNET

(57) ABSTRACT

An antenna structure includes a substrate, a metal element, and a feeding element. The metal element has an open slot. The open slot forms a first resonant path. The substrate is disposed on the metal element. The feeding element is disposed on the substrate, and the metal element and the feeding element are respectively disposed on two opposite sides of the substrate. The feeding element includes a feeding end and a shorting end electrically connected to the metal element. An orthogonal projection of the feeding element on the metal element is partially overlapped with the open slot. The feeding element forms a second resonant path extending from the feeding end to the shorting end. The antenna structure operates in a first band through the first (Continued)

resonant path and operates in a second band through the second resonant path.

20 Claims, 12 Drawing Sheets

(51) Int. Cl.
*H01Q 1/22* (2006.01)
*H01Q 1/52* (2006.01)
*H01Q 9/04* (2006.01)
*H01Q 13/10* (2006.01)
*H01Q 5/50* (2015.01)
*H01Q 21/06* (2006.01)
*H01Q 21/30* (2006.01)
*H04L 29/06* (2006.01)
*H01Q 7/00* (2006.01)

(52) U.S. Cl.
CPC ............ *H01Q 5/50* (2015.01); *H01Q 9/0421* (2013.01); *H01Q 9/0457* (2013.01); *H01Q 13/10* (2013.01); *H01Q 13/106* (2013.01); *H01Q 21/064* (2013.01); *H01Q 21/30* (2013.01); *H01Q 7/00* (2013.01); *H04L 69/18* (2013.01)

(56) References Cited

U.S. PATENT DOCUMENTS

| 2015/0295303 | A1  | 10/2015 | Lee et al. |
| 2017/0309993 | A1* | 10/2017 | Tu .......................... H01Q 1/243 |
| 2018/0040957 | A1* | 2/2018  | Chen ..................... H01Q 13/10 |

FOREIGN PATENT DOCUMENTS

| TW | 201521275 | 6/2015 |
| TW | 201703350 | 1/2017 |
| TW | 201705610 | 2/2017 |

OTHER PUBLICATIONS

"Office Action of Taiwan Counterpart Application," dated Mar. 28, 2019, p. 1-p. 6.

\* cited by examiner us 10,454,167 B2

ANTENNA STRUCTURE

CROSS-REFERENCE TO RELATED APPLICATION

This application claims the priority benefit of U.S. provisional application Ser. No. 62/401,831, filed on Sep. 29, 2016. The entirety of the above-mentioned patent application is hereby incorporated by reference herein and made a part of this specification.

BACKGROUND OF THE INVENTION

[Field of the Invention]

The invention relates to an antenna structure, and in particular, to an antenna structure capable of operating in a first band and a second band.

[Description of Related Art]

As technology advances, wireless communication technologies are widely used in various electronic devices such as smartphones, tablet computers, and laptops. Moreover, an antenna structure plays an important role in wireless communication of electronic devices and is closely related to the quality of wireless communication of electronic devices. However, due to the thinness design needs of electronic devices, the hardware space for accommodating the antenna structure in an electronic device is generally limited. Therefore, how to reduce a size of the antenna structure has become one of the important issues in designing the antenna structure. Moreover, to satisfy the needs of a user, the antenna structure generally has to exhibit a characteristic of multi-band operation to enable the electronic device to support multiple wireless communication protocols and thereby provide diversified functions.

SUMMARY OF THE INVENTION

The invention provides an antenna structure which uses an open slot of a metal element to form a first resonant path and uses a feeding element to form a second resonant path. Accordingly, a size of the antenna structure can be reduced, and the antenna structure has a characteristic of multi-band operation.

An antenna structure of the invention includes a substrate, a metal element, and a feeding element. The metal element has an open slot, and the open slot forms a first resonant path. The substrate is disposed on the metal element. The feeding element is disposed on the substrate, and the metal element and the feeding element are respectively disposed on two opposite sides of the substrate. The feeding element includes a feeding end and a shorting end. The shorting end is electrically connected to the metal element. An orthogonal projection of the feeding element on the metal element is partially overlapped with the open slot. The feeding element forms a second resonant path extending from the feeding end to the shorting end. The antenna structure operates in a first band through the first resonant path and operates in a second band through the second resonant path.

In an embodiment of the invention, a length of the first resonant path is a quarter of a wavelength of the first band. A length of the second resonant path is a half of a wavelength of the second band.

In an embodiment of the invention, the open slot has a closed end, an open end, and a first edge, and the first edge is located between the closed end and the open end. An orthogonal projection of the feeding end of the feeding element on the metal element is close to the closed end, and an orthogonal projection of the shorting end of the feeding element on the metal element is close to the first edge.

In light of the above, the antenna structure of the invention uses the open slot of the metal element to form the first resonant path and uses the feeding element to form the second resonant path. Moreover, the antenna structure operates in the first band and the second band through the first resonant path and the second resonant path. Accordingly, the size of the antenna structure can be reduced, and the antenna structure has the characteristic of multi-band operation.

To provide a further understanding of the aforementioned and other features and advantages of the disclosure, exemplary embodiments, together with the reference drawings, are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
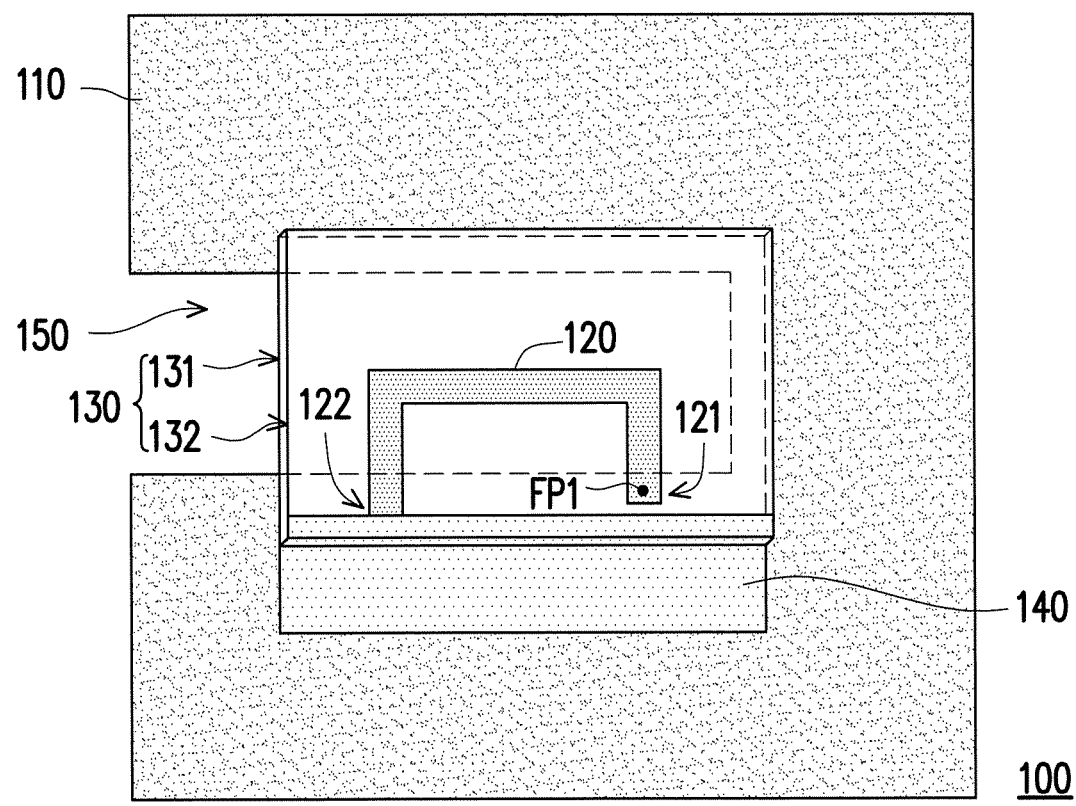
FIG. 1 is a schematic diagram illustrating an antenna structure according to an embodiment of the invention.

FIG. 1 is a schematic diagram illustrating an antenna structure according to an embodiment of the invention. As shown in FIG. 1, an antenna structure 100 includes a metal element 110, a feeding element 120, and a substrate 130. The feeding element 120 is disposed on the substrate 130, and the feeding element 120 includes a feeding end 121 and a shorting end 122. Moreover, the feeding end 121 of the feeding element 120 has a feeding point FP1. The shorting end 122 of the feeding element 120 is electrically connected to the metal element 110. In addition, the antenna structure 100 further includes a connection element 140, and the connection element 140 extends from the substrate 130 to the metal element 110 to electrically connect the shorting end 122 of the feeding element 120 and the metal element 110.

Figure 2A:
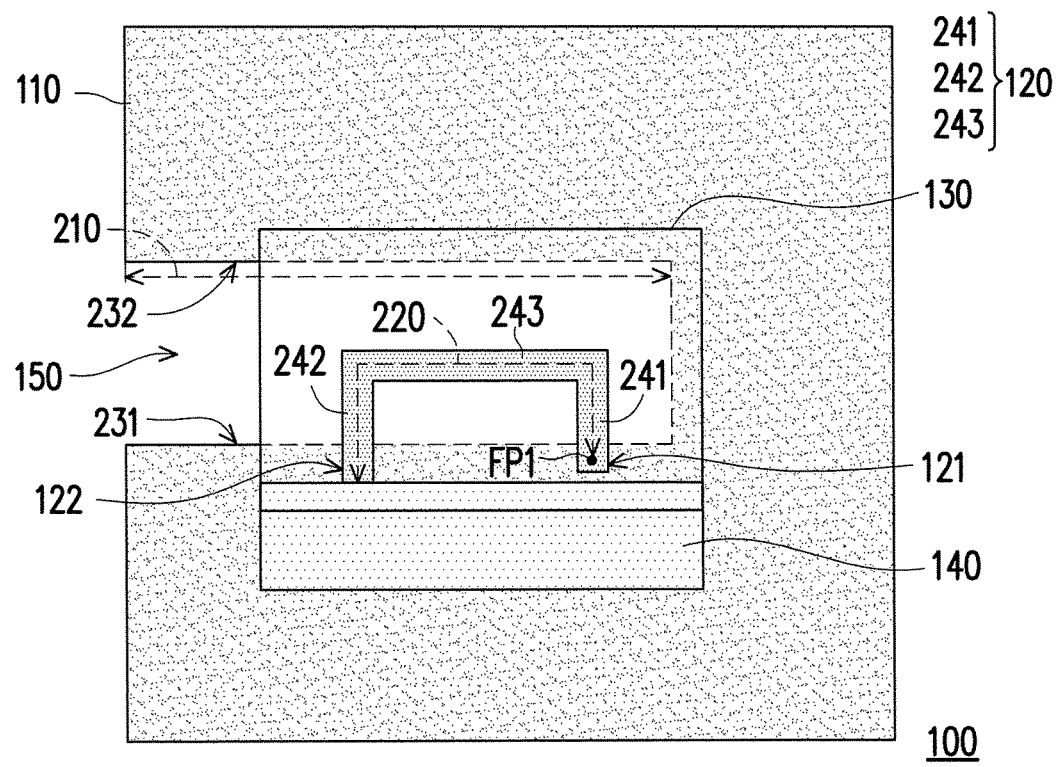
FIG. 2A is a schematic diagram illustrating a projection of the antenna structure of FIG. 1.

Furthermore, the substrate 130 is disposed on the metal element 110. The metal element 110 has an open slot 150. The feeding element 120 is stacked above the open slot 150 through the substrate 130. In other words, the metal element 110 and the feeding element 120 are respectively disposed on two opposite sides of the substrate 130. Next, referring to FIG. 2A, FIG. 2A is a schematic diagram illustrating a projection of the antenna structure of FIG. 1. As shown in FIG. 2A, an orthogonal projection of the feeding element 120 on the metal element 110 is partially overlapped with the open slot 150.

In operation, the open slot 150 forms a first resonant path 210, and the antenna structure 100 operates in a first band through the first resonant path 210. Specifically, a length of the first resonant path 210 (i.e., a length of the open slot 150) is equal to a quarter of a wavelength of the first band. In other words, the open slot 150 may be used to constitute an open slot antenna, and the feeding element 120 may be used to excite the open slot antenna such that the open slot antenna may operate in the first band. On the other hand, the feeding element 120 fauns a second resonant path 220 extending from the feeding end 121 to the shorting end 122, and the antenna structure 100 operates in a second band through the second resonant path 220. Specifically, a length of the second resonant path 220 is equal to a half of a wavelength of the second band. Namely, the feeding element 120 may constitute a loop antenna, and the loop antenna may operate in the second band.

In other words, the antenna structure 100 forms the open slot antenna by using the open slot 150 in the metal element 110 to thereby cover the first band. Moreover, the antenna structure 100 further forms the loop antenna by using the feeding element 120 of the open slot antenna to thereby cover the second band. Accordingly, the antenna structure 100 has a characteristic of multi-band operation, and an electronic device including the antenna structure 100 may support multiple wireless communication protocols and thereby provide diversified functions. Moreover, since the antenna structure 100 directly uses the open slot 150 on the metal element 110 and the feeding element 120 disposed on the open slot 150 to form the two resonant paths, such configuration contributes to reducing a size of the antenna structure 100, and the antenna structure 100 may meet the thinness design needs of electronic devices.

Detailed configurations of the antenna structure 100 will be further described below with reference to FIG. 1 and FIG. 2A. As shown in FIG. 1, the substrate 130 includes a first surface 131 and a second surface 132, and first surface 131 and the second surface 132 are opposite to each other. The first surface 131 is disposed on the metal element 110, and the feeding element 120 is disposed on the second surface 132. The connection element 140 extends from the second surface 132 of the substrate 130 onto the metal element 110 and electrically connects the shorting end 122 of the feeding element 120 and the metal element 110.

As shown in FIG. 2A, the open slot 150 has a first edge 231 and a second edge 232. Moreover, the first edge 231 and the second edge 232 are opposite to each other and are located between an open end and a closed end of the open slot 150. In overall configuration, an orthogonal projection of the feeding end 121 of the feeding element 120 on the metal element 110 is close to the closed end and the first edge 231 of the open slot 150, and an orthogonal projection of the shorting end 122 of the feeding element 120 on the metal element 110 is close to the first edge 231 of the open slot 150. In other words, the feeding end 121 of the feeding element 120 is close to the closed end of the open slot 150, and the orthogonal projections of the feeding end 121 and the shorting end 122 of the feeding element 120 on the metal element 110 are located on the same side of the open slot 150 (i.e., being close to the first edge 231 of the open slot 150).

The feeding element 120 includes a first segment 241, a second segment 242, and a third segment 243. Specifically, a first end of the first segment 241 is used to form the feeding end 121 of the feeding element 120, a first end of the second segment 242 is used to form the shorting end 122 of the feeding element 120, and the third segment 243 electrically connects between a second end of the first segment 241 and a second end of the second segment 242. In other words, the first segment 241, the third segment 243, and the second segment 242 form the second resonant path 220.

Furthermore, the first segment 241 faces the second segment 242, and an orthogonal projection of the first segment 241 on the metal element 110 is close to the closed end of the open slot 150. Orthogonal projections of the first segment 241 and the second segment 242 on the metal element 110 are partially overlapped with the first edge 231 of the open slot 150, and an orthogonal projection of the third segment 243 on the metal element 110 is located in the open slot 150. Moreover, the first segment 241, the second segment 242, and the third segment 243 may be in a long-strip shape, and the open slot 150 may also be in a long-strip shape.

Figure 2B:
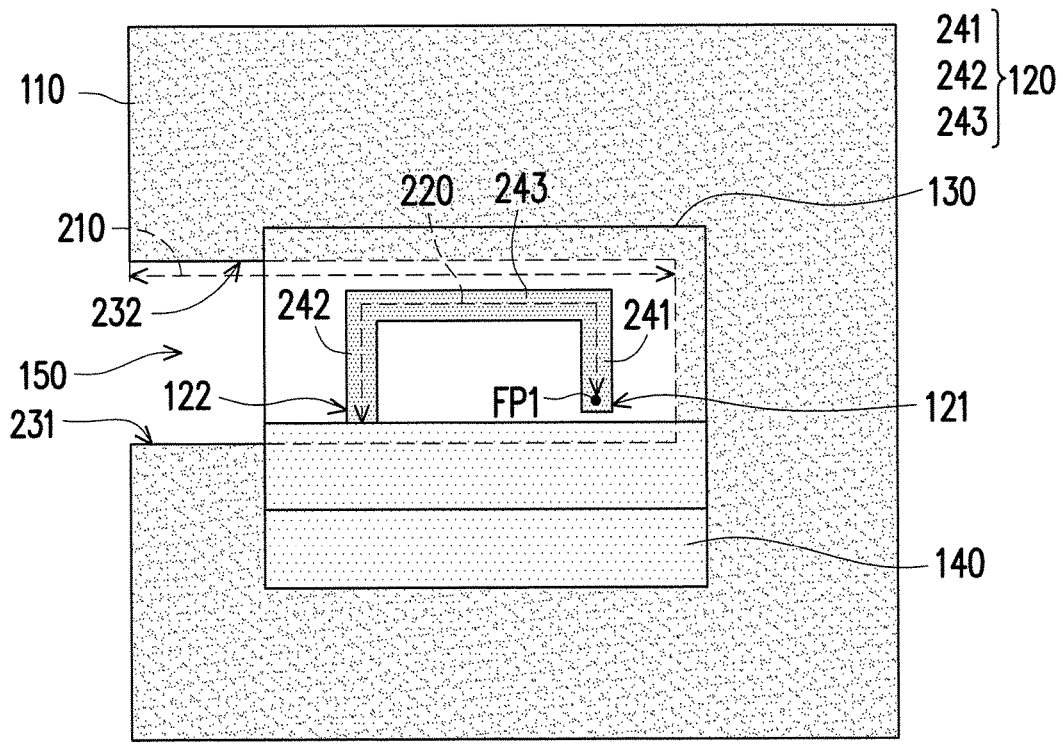
FIG. 2B is a schematic diagram illustrating a projection of an antenna structure according to another embodiment of the invention.

In another embodiment, the orthogonal projection of the feeding element 120 on the metal element 110 may be entirely located in the open slot 150. For example, FIG. 2B is a schematic diagram illustrating a projection of an antenna structure according to another embodiment of the invention. As shown in FIG. 2B, the orthogonal projections of the first segment 241, the second segment 242, and the third segment 243 on the metal element 110 are located in the open slot 150. In addition, although the embodiment of FIG. 1 illustrates the exemplary configurations of the feeding element 120 and the open slot 150, the invention is not limited thereto.

Figure 3:
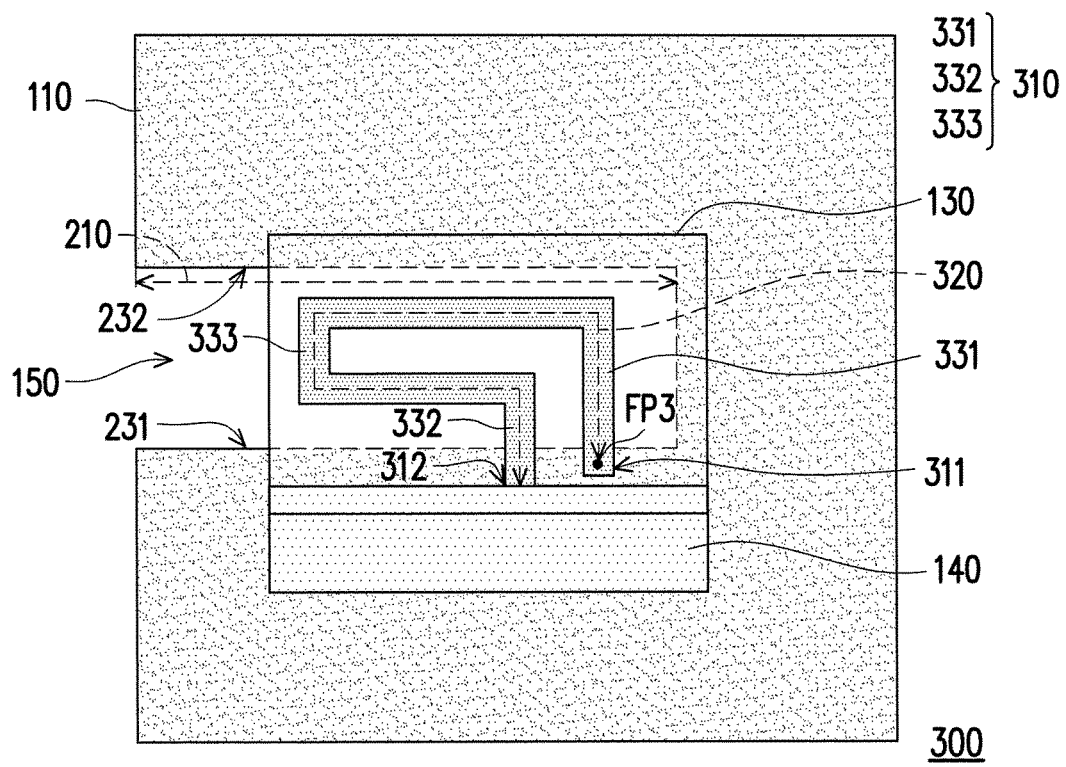
FIG. 3 and FIG. 4 are schematic diagrams respectively illustrating a projection of an antenna structure according to another embodiment of the invention.
Figure 4:
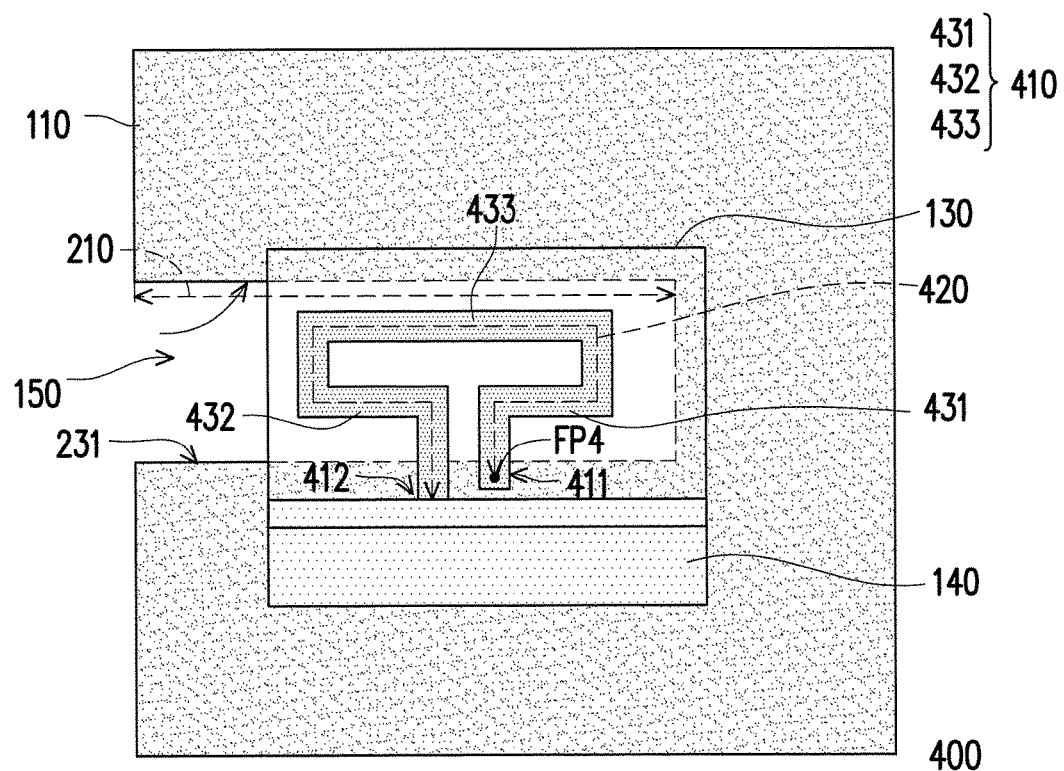

For example, FIG. 3 and FIG. 4 are schematic diagrams respectively illustrating a projection of an antenna structure according to another embodiment of the invention. As shown in FIG. 3, in an antenna structure 300, a feeding element 310 includes a feeding end 311 having a feeding point FP3 and a shorting end 312 connected to the metal element 110, and the feeding element 310 forms a second resonant path 320 extending from the feeding end 311 to the shorting end 312. Moreover, the feeding element 310 further includes a first segment 331, a second segment 332, and a third segment 333. Specifically, the first segment 331 and the second segment 332 may be in a long-strip shape, and the third segment 333 may be in an inverted U-shape. In operation, similar to the embodiment of FIG. 1, the feeding element 310 may be used to excite an open slot antenna formed by the open slot 150, and the feeding element 310 may be further used to constitute a loop antenna. Accordingly, the antenna structure 300 covers the first band and the second band. The detailed configurations and operations of the components in the embodiment of FIG. 3 are already included in the embodiment of FIG. 1 and are thus not repeatedly described here.

As shown in FIG. 4, in an antenna structure 400, a feeding element 410 includes a feeding end 411 having a feeding point FP4 and a shorting end 412 connected to the metal element 110, and the feeding element 410 includes a second resonant path 420 extending from the feeding end 411 to the shorting end 412. Moreover, the feeding element 410 further includes a first segment 431, a second segment 432, and a third segment 433. Specifically, the first segment 431 and the second segment 432 may be in an inverted L-shape, and the third segment 433 may be in an inverted U-shape. In operation, similar to the embodiment of FIG. 1, the feeding element 410 may be used to excite an open slot antenna formed by the open slot 150, and the feeding element 410 may be further used to constitute a loop antenna. Accordingly, the antenna structure 400 covers the first band and the second band. The detailed configurations and operations of the components in the embodiment of FIG. 4 are already included in the embodiment of FIG. 1 and are thus not repeatedly described here.

Figure 5:
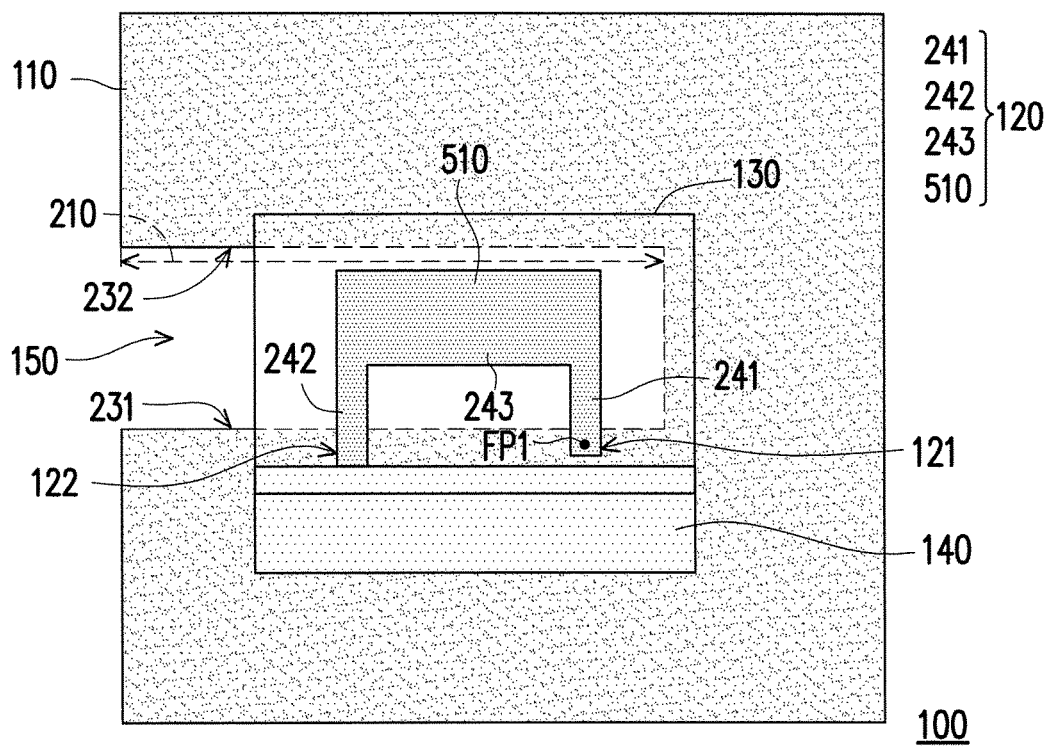
FIG. 5 to FIG. 7 are schematic diagrams respectively illustrating a projection of an antenna structure according to another embodiment of the invention.
Figure 6:
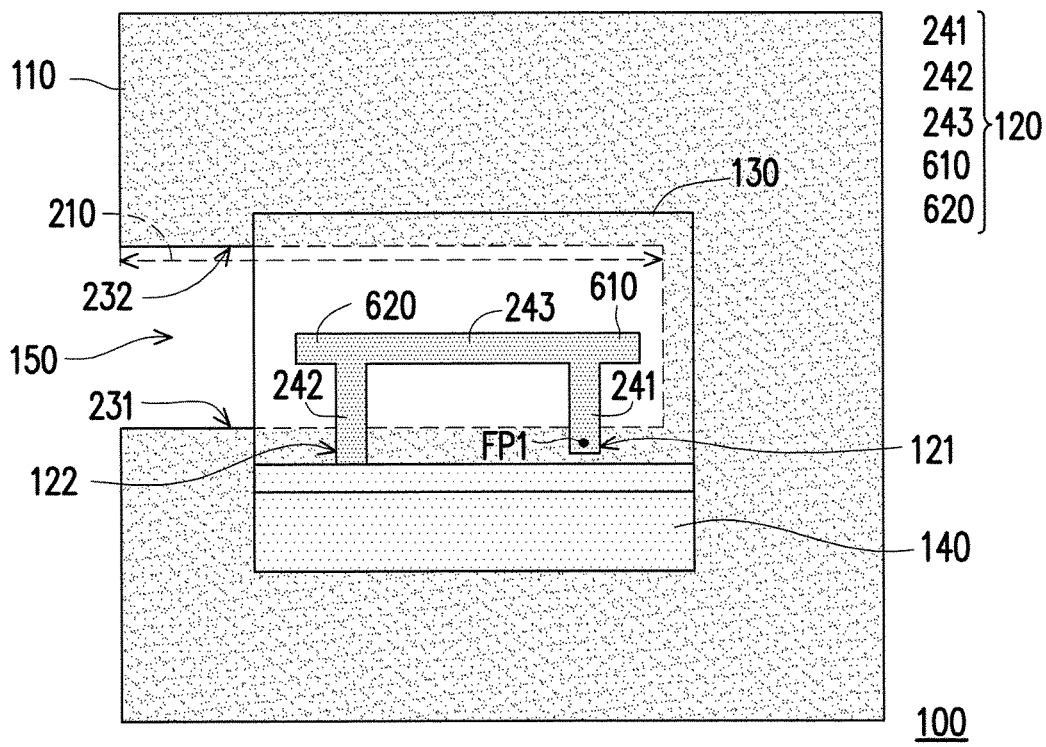
Figure 7:
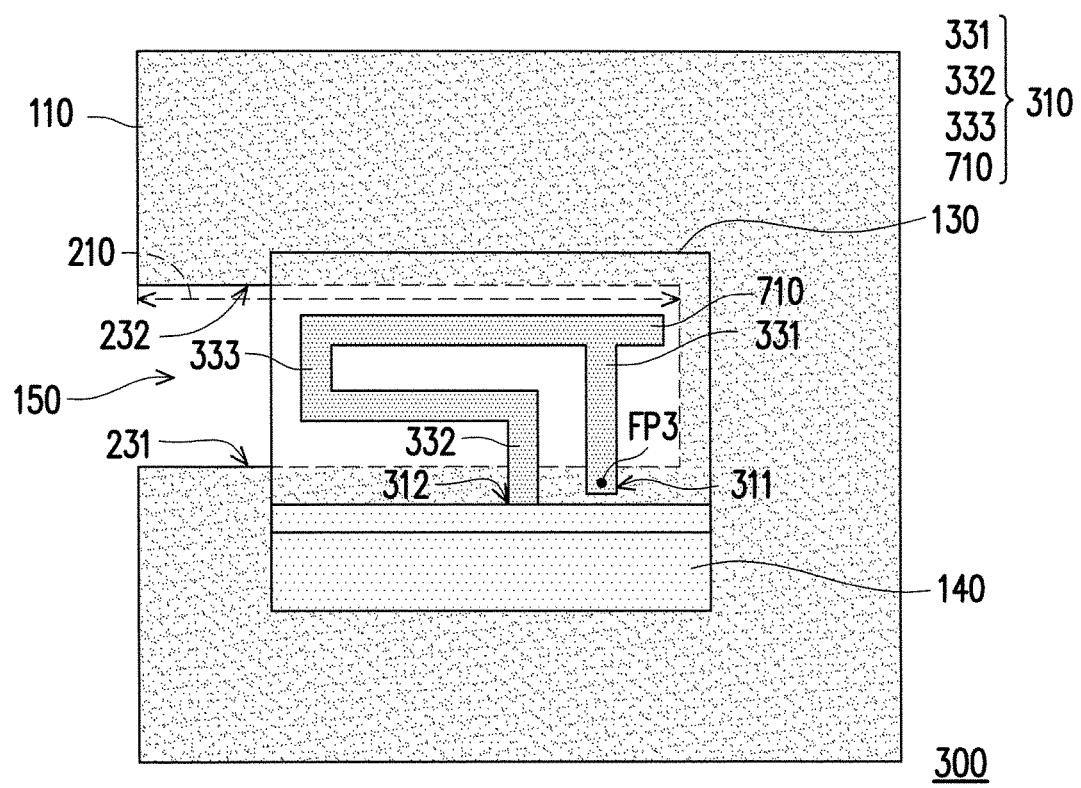

It shall be mentioned that the feeding element in the foregoing antenna structures may further include an extended segment, and the antenna structure may use the extended segment to enhance radiation characteristics, e.g., an operation band, an operation bandwidth, and/or an amount of coupling between the feeding element and the open slot. For example, FIG. 5 to FIG. 7 are schematic diagrams respectively illustrating a projection of an antenna structure according to another embodiment of the invention. Particularly, the embodiment of FIG. 5 illustrates an extended segment 510 extending from the feeding element 120 of FIG. 1, the embodiment of FIG. 6 illustrates a first extended segment 610 and a second extended segment 620 extending from the feeding element 120 of FIG. 1, and the embodiment of FIG. 7 illustrates a first extended segment 710 extending from the feeding element 310 of FIG. 3.

Specifically, in the embodiment of FIG. 5, the feeding element 120 further includes the extended segment 510. A first end of the extended segment 510 is electrically connected to the third segment 243, and an orthogonal projection of a second end of the extended segment 510 on the metal element 110 extends toward the second edge 232 of the open slot 150. Moreover, the extended segment 510 may be a rectangular metal sheet. Accordingly, the extended segment 510 may be used to enhance the amount of coupling between the feeding element 120 and the open slot 150, which thereby contributes to exciting a resonance mode of the open slot 150.

In the embodiment of FIG. 6, the feeding element 120 further includes the first extended segment 610 and the second extended segment 620. Specifically, a first end of the first extended segment 610 is electrically connected to a first end of the third segment 243, and an orthogonal projection of a second end of the first extended segment 610 on the metal element 110 extends toward the closed end of the open slot 150. A first end of the second extended segment 620 is electrically connected to a second end of the third segment 243, and an orthogonal projection of a second end of the second extended segment 620 on the metal element 110 extends toward the open end of the open slot 150. Moreover, the first extended segment 610 and the second extended segment 620 may be in a long-strip shape. Accordingly, the first extended segment 610 and the second extended segment 620 may be used to enhance the amount of coupling between the feeding element 120 and the open slot 150, which thereby contributes to exciting the resonance mode of the open slot 150.

In the embodiment of FIG. 7, the feeding element 310 further includes the first extended segment 710. Specifically, a first end of the first extended segment 710 is electrically connected to a first end of the third segment 333, and an orthogonal projection of a second end of the first extended segment 710 on the metal element 110 extends toward the closed end of the open slot 150. Moreover, the first extended segment 710 may be in a long-strip shape. Accordingly, the first extended segment 710 may be used to enhance the amount of coupling between the feeding element 310 and the open slot 150, which thereby contributes to exciting the resonance mode of the open slot 150.

Figure 8:
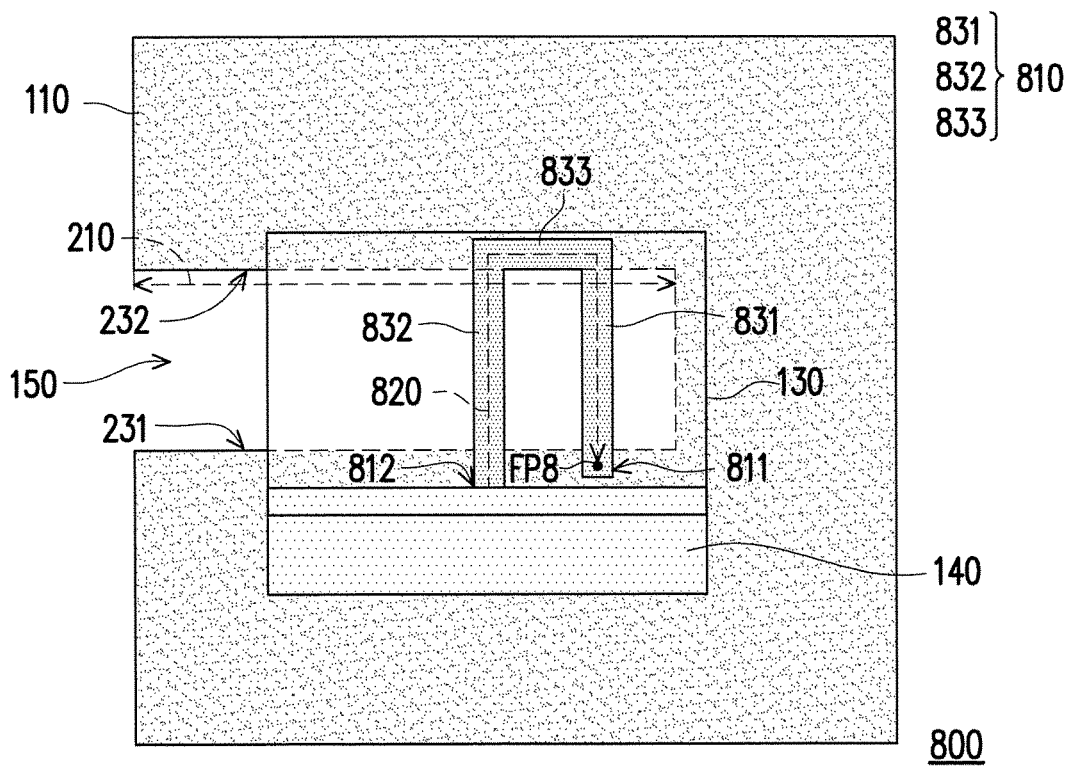
FIG. 8 is a schematic diagram illustrating a projection of an antenna structure according to another embodiment of the invention.

FIG. 8 is a schematic diagram illustrating a projection of an antenna structure according to another embodiment of the invention. As shown in FIG. 8, in an antenna structure 800, a feeding element 810 includes a feeding end 811 having a feeding point FP8 and a shorting end 812 connected to the metal element 110, and the feeding element 810 includes a second resonant path 820 extending from the feeding end 811 to the shorting end 812.

In this embodiment, the feeding element 810 further includes a first segment 831, a second segment 832, and a third segment 833. Specifically, an orthogonal projection of the first segment 831 on the metal element 110 is partially overlapped with the first edge 231 and the second edge 232 of the open slot 150, and an orthogonal projection of the second segment 832 on the metal element 110 is partially overlapped with the first edge 231 and the second edge 232 of the open slot 150. The third segment 833 is close to the second edge 232 of the open slot 150, and an orthogonal projection of the third segment 833 on the metal element 110 is overlapped with the metal element 110. In other words, the orthogonal projection of the third segment 833 on the metal element 110 is not located in the open slot 150. In operation, similar to the embodiment of FIG. 1, the feeding element 810 may constitute a loop antenna and may be used as a feeding structure of the open slot 150 to thereby excite the first band and the second band of the antenna structure 800. The detailed configurations and operations of the components in the embodiment of FIG. 8 are already included in the embodiment of FIG. 1 and are thus not repeatedly described here.

Figure 9:
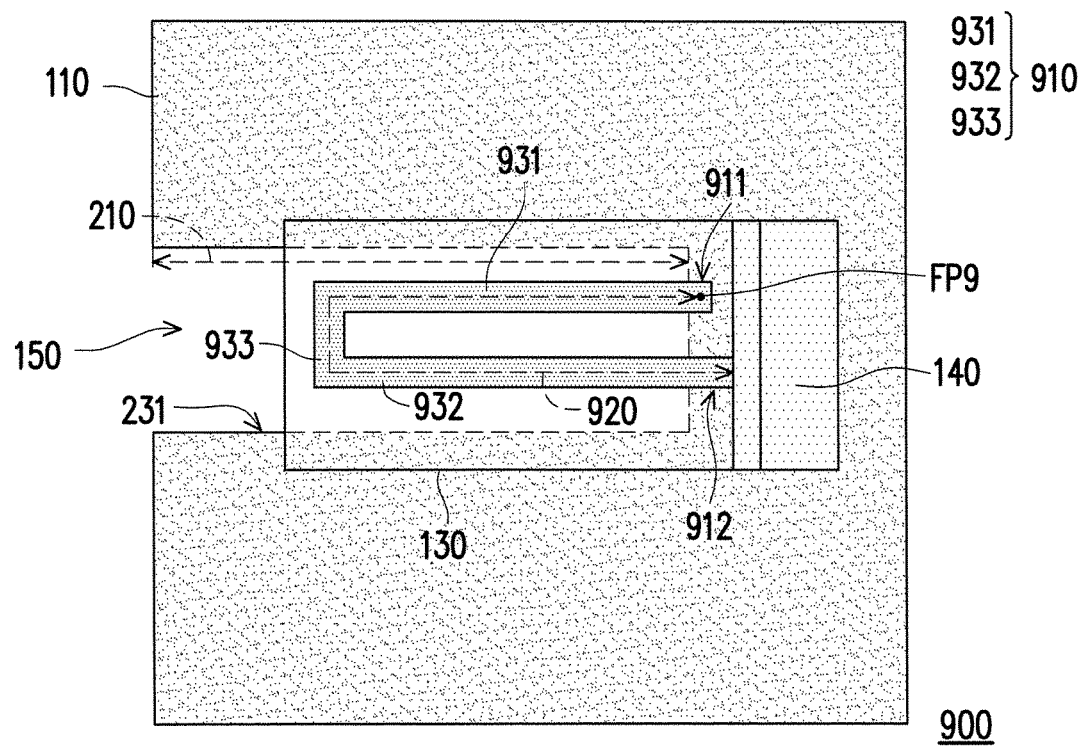
FIG. 9 is a schematic diagram illustrating a projection of an antenna structure according to another embodiment of the invention.

In another embodiment, the feeding element of the foregoing antenna structures may also be disposed at different positions of the open slot according to the needs of a user. Accordingly, the feeding element may still form a loop antenna and may be used to excite the open slot. For example, FIG. 9 is a schematic diagram illustrating a projection of an antenna structure according to another embodiment of the invention. As shown in FIG. 9, in an antenna structure 900, a feeding element 910 includes a feeding end 911 having a feeding point FP9 and a shorting end 912 connected to the metal element 110, and the feeding element 910 includes a second resonant path 920 extending from the feeding end 911 to the shorting end 912.

In overall configuration, an orthogonal projection of the feeding end 911 of the feeding element 910 on the metal element 110 is close to the closed end and the second edge 232 of the open slot 150, and an orthogonal projection of the shorting end 912 of the feeding element 910 on the metal element 110 is close to the closed end and the first edge 231 of the open slot 150. Moreover, the feeding element 910 further includes a first segment 931, a second segment 932, and a third segment 933. Specifically, orthogonal projections of the first segment 931 and the second segment 932 on the metal element 110 are partially overlapped with the closed end of the open slot 150. An orthogonal projection of the third segment 933 on the metal element 110 is located in the open slot 150 and is close to the open end of the open slot 150.

In operation, similar to the embodiment of FIG. 1, the first segment 931, the third segment 933, and the second segment 932 form the second resonant path 920. In other words, the feeding element 910 may constitute a loop antenna. Moreover, the feeding element 910 may be further used as a feeding structure of the open slot 150 to thereby excite the first band and the second band of the antenna structure 900. The detailed configurations and operations of the components in the embodiment of FIG. 9 are already included in the embodiment of FIG. 1 and are thus not repeatedly described here.

It shall be noted that the foregoing antenna structures are applicable to an electronic device, and the metal element 110 in the antenna structures may be formed by a metal back cover of the electronic device, a metal housing of a hinge structure, or a combination thereof.

Figure 10:
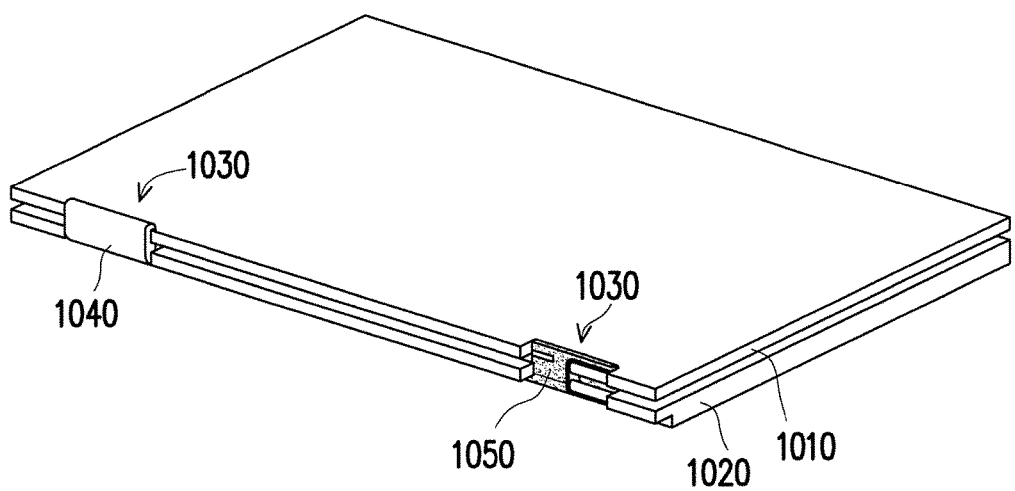
FIG. 10 is a perspective schematic diagram illustrating an electronic device according to an embodiment of the invention.

For example, FIG. 10 is a perspective schematic diagram illustrating an electronic device according to an embodiment of the invention. As shown in FIG. 10, an electronic device 1000 is, for example, a laptop, and the electronic device 1000 includes a first body 1010, a second body 1020, and a plurality of hinge structures 1030. Specifically, the hinge structures 1030 are disposed between the first body 1010 and the second body 1020, and the first body 1010 and the second body 1020 may rotate relatively to each other through the hinge structures 1030. Moreover, the hinge structure 1030 includes an insulating housing 1040 and a metal housing 1050, and the metal housing 1050 may be used to constitute the metal element 110 in the foregoing antenna structures.

Figure 11:
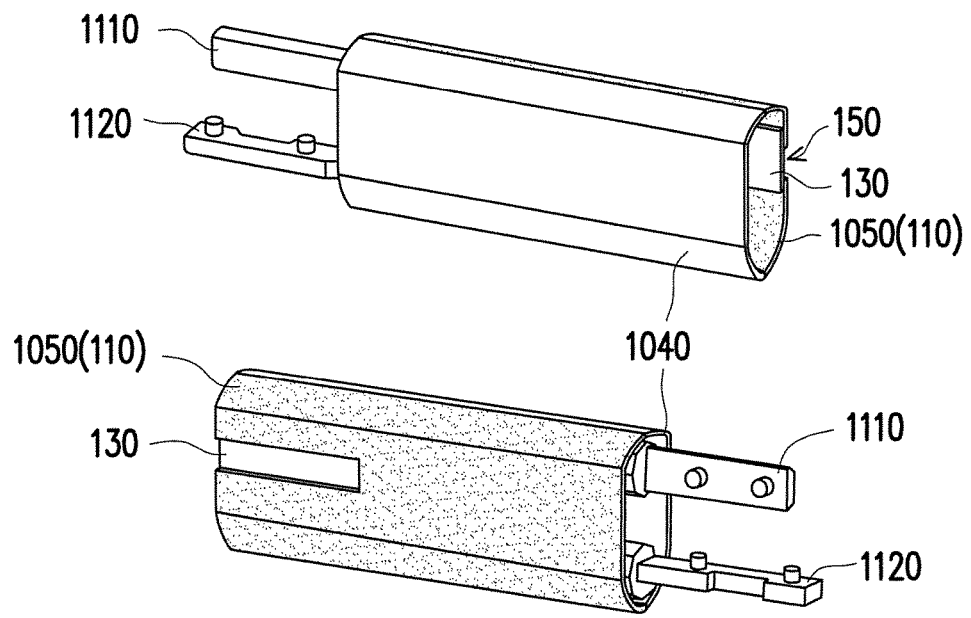
FIG. 11 and FIG. 12 are perspective diagrams respectively illustrating an antenna structure combined with a hinge structure of FIG. 10.
Figure 12:
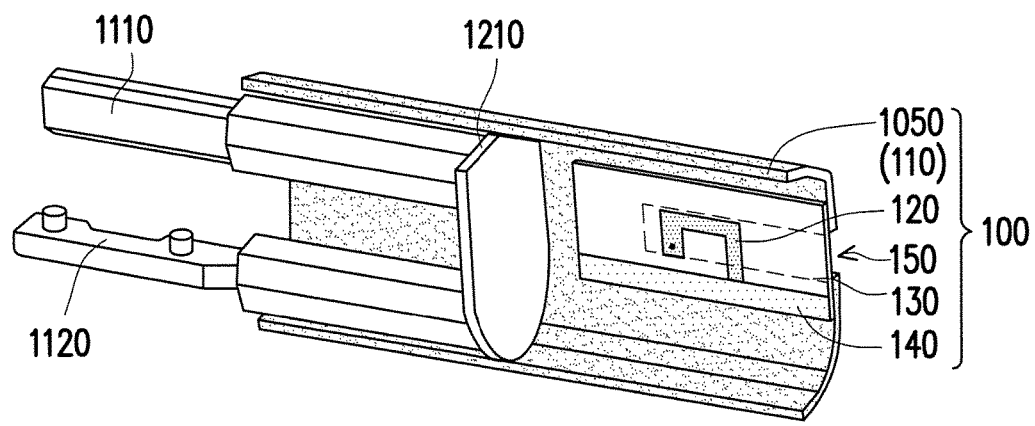

For example, FIG. 11 and FIG. 12 are perspective diagrams respectively illustrating an antenna structure combined with the hinge structure of FIG. 10, and FIG. 11 and FIG. 12 illustrate the antenna structure 100 of FIG. 1 as an example. As shown in FIG. 11 and FIG. 12, the metal housing 1050 may be used to constitute the metal element 110 in the antenna structure 100, and the open slot 150 in the antenna structure 100 may be disposed on the metal housing 1050. Moreover, the substrate 130 in the antenna structure 100 may cover over the open slot 150 of the metal housing 1050, and the feeding element 120 in the antenna structure 100 may be stacked above the open slot 150 through the substrate 130. In operation, the antenna structure 100 may cover the first band by using the open slot 150 on the metal housing 1050, and may cover the second band by using the feeding element 120.

As shown in FIG. 11 and FIG. 12, the hinge structure 1030 further includes a first rotating shaft 1110, a second rotating shaft 1120, and a pivot base 1210. Specifically, the first rotating shaft 1110 and the second rotating shaft 1120 are parallel to each other and are pivoted to the pivot base 1210. Moreover, the first rotating shaft 1110 is fixed to the first body 1010, and the second rotating shaft 1120 is fixed to the second body 1020. Accordingly, an opening angle of the first body 1010 with respect to the second body 1020 may change as the first rotating shaft 1110 and the second rotating shaft 1120 rotate.

Figure 13:
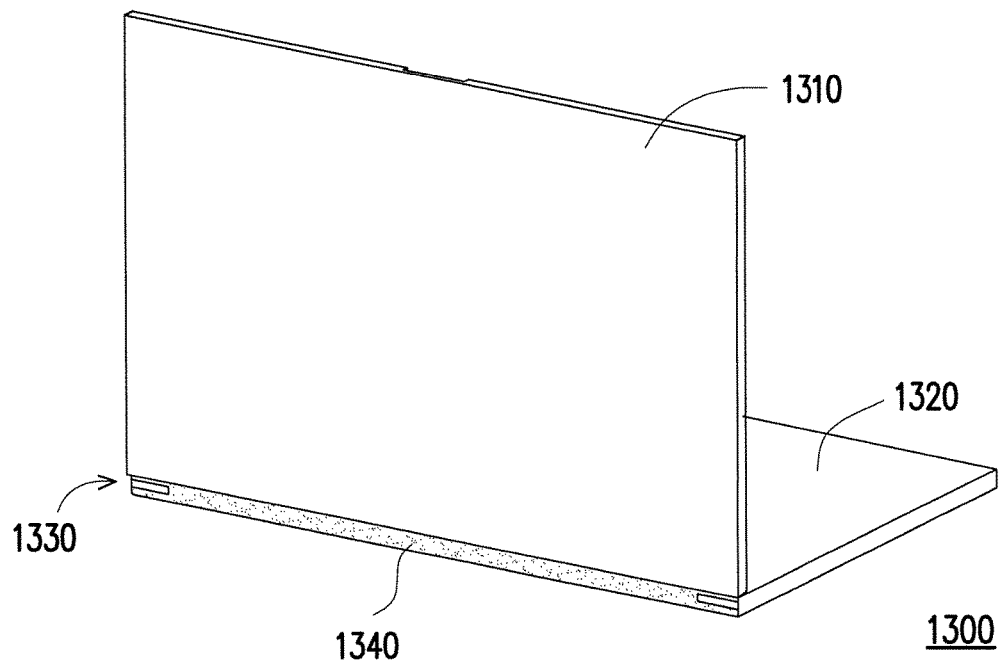
FIG. 13 and FIG. 14 are perspective schematic diagrams respectively illustrating a back and a front of an electronic device according to another embodiment of the invention.
Figure 14:
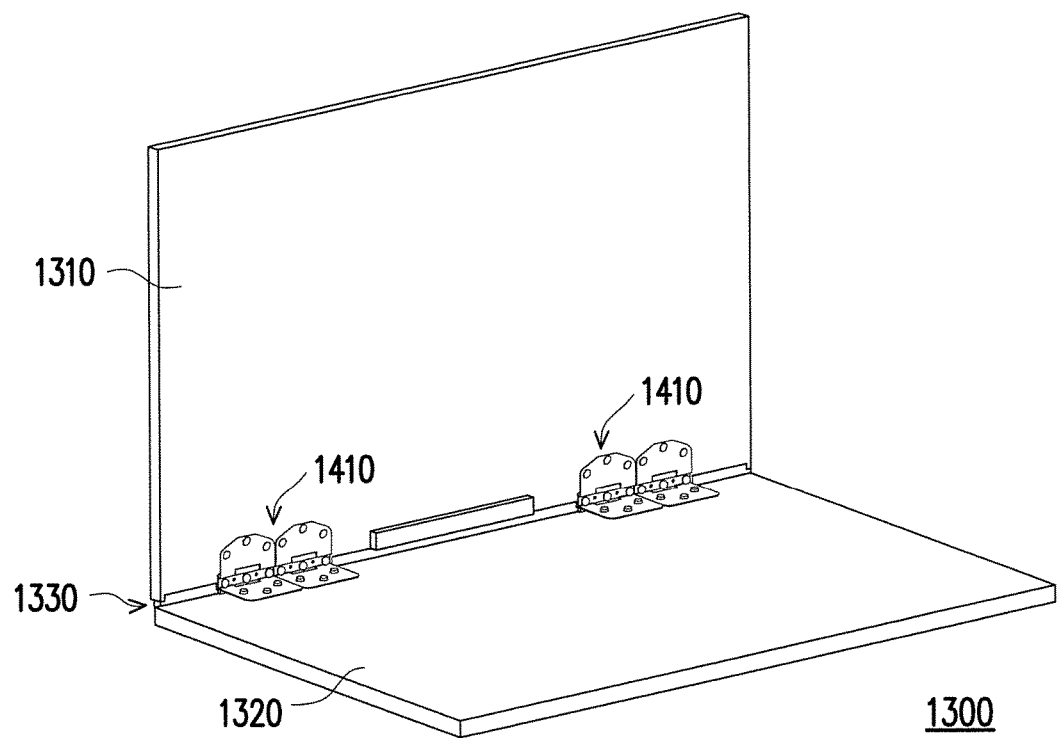

FIG. 13 and FIG. 14 are perspective schematic diagrams respectively illustrating a back and a front of an electronic device according to another embodiment of the invention. As shown in FIG. 13 and FIG. 14, an electronic device 1300 is, for example, a laptop, and the electronic device 1300 includes a first body 1310, a second body 1320, and a hinge structure 1330. Specifically, the hinge structure 1330 is disposed between the first body 1310 and the second body 1320, and the first body 1310 and the second body 1320 may rotate relatively to each other through the hinge structure 1330. Moreover, the hinge structure 1330 includes a metal housing 1340 and a plurality of hinge assemblies 1410, and the metal housing 1340 may be used to constitute the metal element 110 in the foregoing antenna structures.

Figure 15:
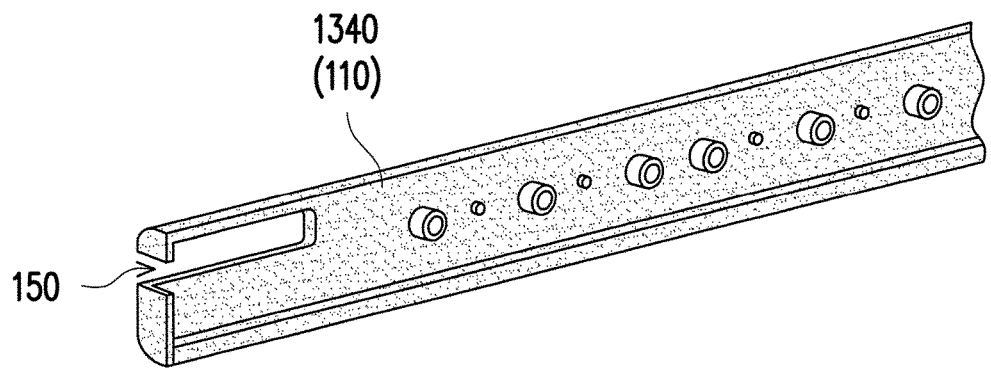
FIG. 15 is a perspective diagram illustrating a metal housing of FIG. 13.
Figure 16:
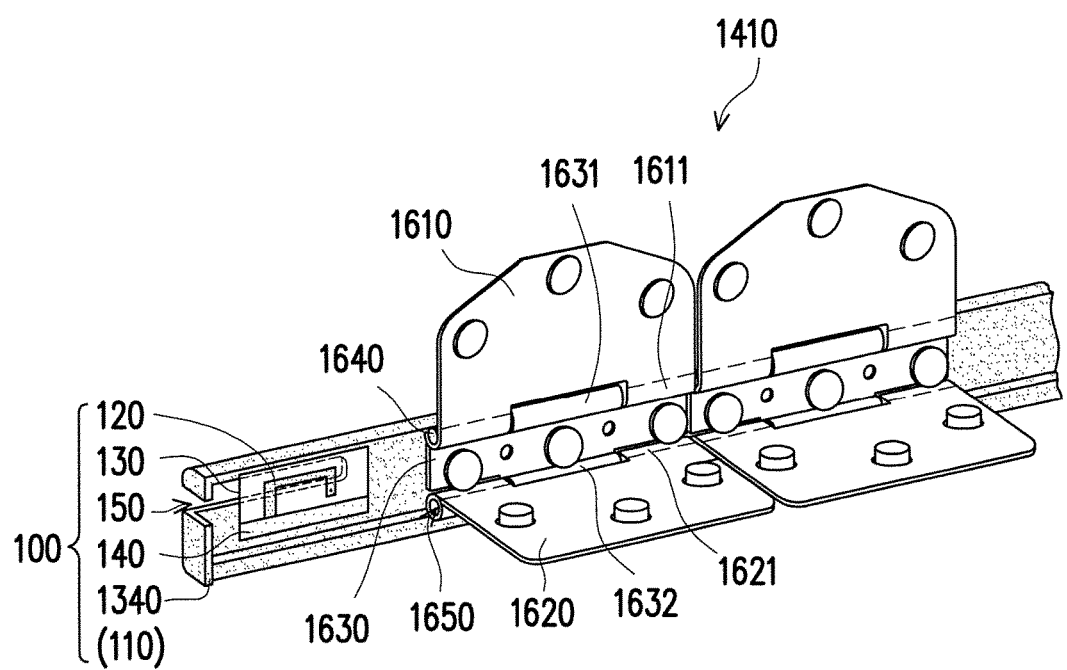
FIG. 16 is a perspective diagram illustrating an antenna structure combined with a hinge structure of FIG. 13.

For example, FIG. 15 is a perspective diagram illustrating the metal housing of FIG. 13, FIG. 16 is a perspective diagram illustrating an antenna structure combined with the hinge structure of FIG. 13, and FIG. 16 illustrates the antenna structure 100 of FIG. 1 as an example. As shown in FIG. 15 and FIG. 16, the metal housing 1340 may be used to constitute the metal element 110 in the antenna structure 100, and the open slot 150 in the antenna structure 100 may be disposed on the metal housing 1340. Moreover, the substrate 130 in the antenna structure 100 may cover over the open slot 150 of the metal housing 1340, and the feeding element 120 in the antenna structure 100 may be stacked above the open slot 150 through the substrate 130. In operation, the antenna structure 100 may cover the first band by using the open slot 150 on the metal housing 1340, and may cover the second band by using the feeding element 120.

As shown in FIG. 16, the hinge assembly 1410 includes a first bracket 1610, a second bracket 1620, a connection bracket 1630, a first rotating shaft 1640, and a second rotating shaft 1650. Specifically, the first bracket 1610 and the second bracket 1620 are pivoted to the connection bracket 1630. The first bracket 1610 is fixed to the first body 1310, and the second bracket 1620 is fixed to the second body 1320. Moreover, a sleeve 1611 of the first bracket 1610 and a first connection sleeve 1631 of the connection bracket 1630 are pivoted to each other via the first rotating shaft 1640. A sleeve 1621 of the second bracket 1620 and a second connection sleeve 1632 of the connection bracket 1630 are pivoted to each other via the second rotating shaft 1650. Accordingly, the first body 1310 and the second body 1320 may rotate relatively to each other through the hinge assemblies 1410.

In another embodiment, the metal element 110 in the foregoing antenna structures may also be constituted by the metal housing in the hinge structure and the metal back cover in the body, and matching of the antenna structure may be adjusted by adjusting the configurational position of the feeding element in the antenna structures.

Figure 17:
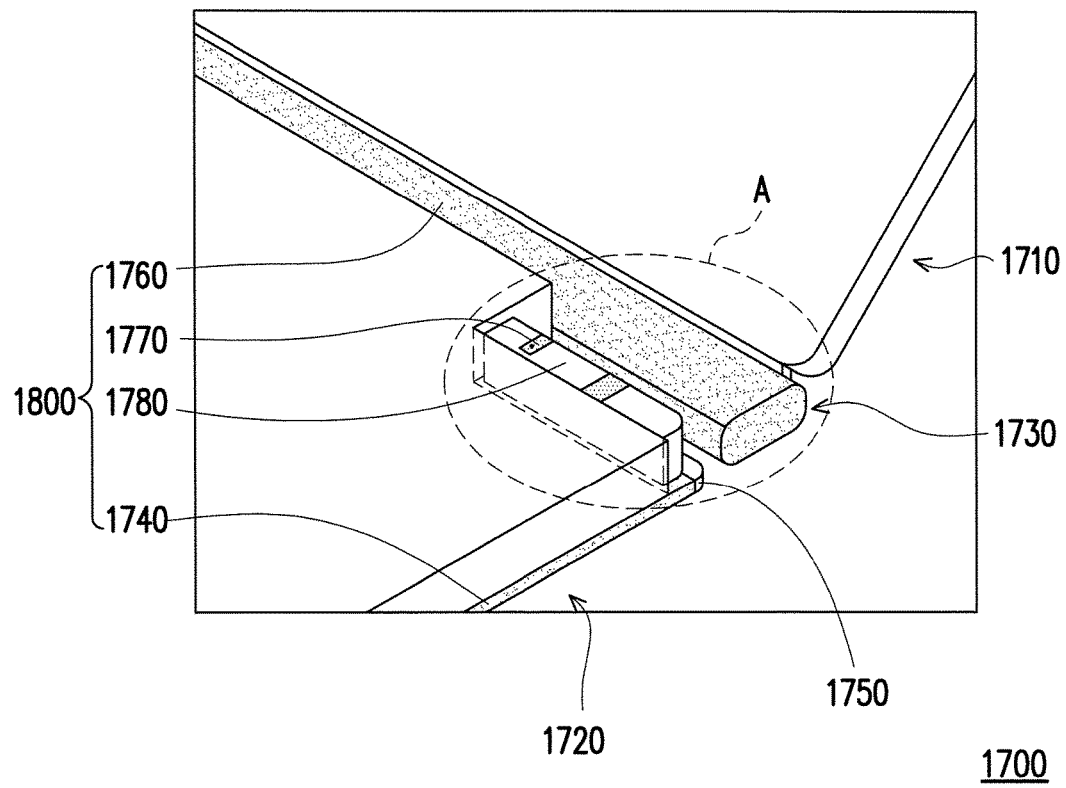
FIG. 17 is a perspective schematic diagram illustrating an electronic device including an antenna structure according to an embodiment of the invention.

For example, FIG. 17 is a perspective schematic diagram illustrating an electronic device including an antenna structure according to an embodiment of the invention. As shown in FIG. 17, an electronic device 1700 includes a first body 1710, a second body 1720, and a hinge structure 1730. Specifically, the first body 1710 and the second body 1720 may rotate relatively to each other through the hinge structure 1730. The second body 1720 includes a metal back cover 1740 and an insulating element 1750, and the hinge structure 1730 includes a metal housing 1760. Moreover, the electronic device 1700 further includes an antenna structure

1800 disposed on the second body 1720, and the antenna structure 1800 includes a feeding element 1770, a substrate 1780, the metal back cover 1740, and the metal housing 1760. The feeding element 1770 is disposed on the substrate 1780, and the substrate 1780 is disposed on the metal back cover 1740 and the insulating element 1750.

Figure 18:
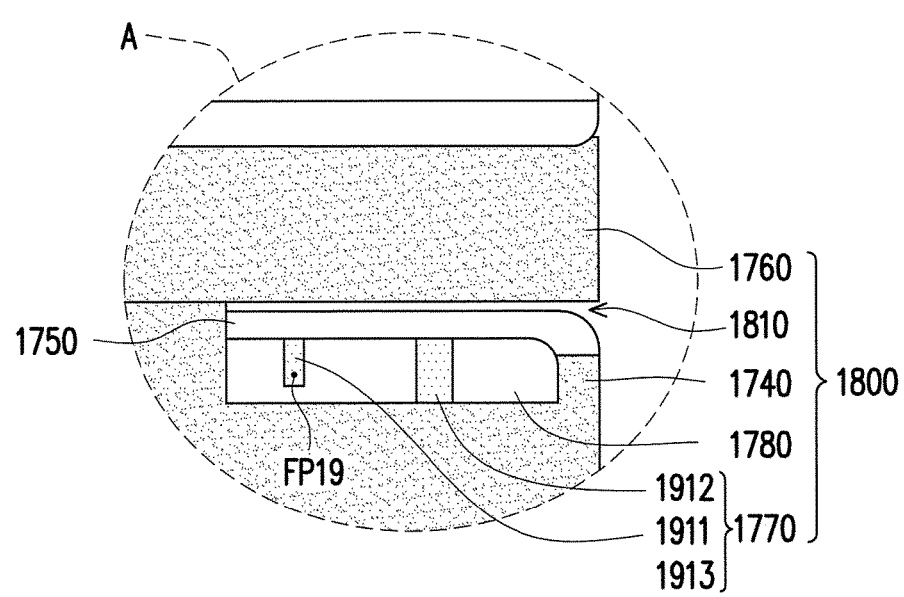
FIG. 18 is an enlarged schematic diagram illustrating a region A in FIG. 17.
Figure 19A:
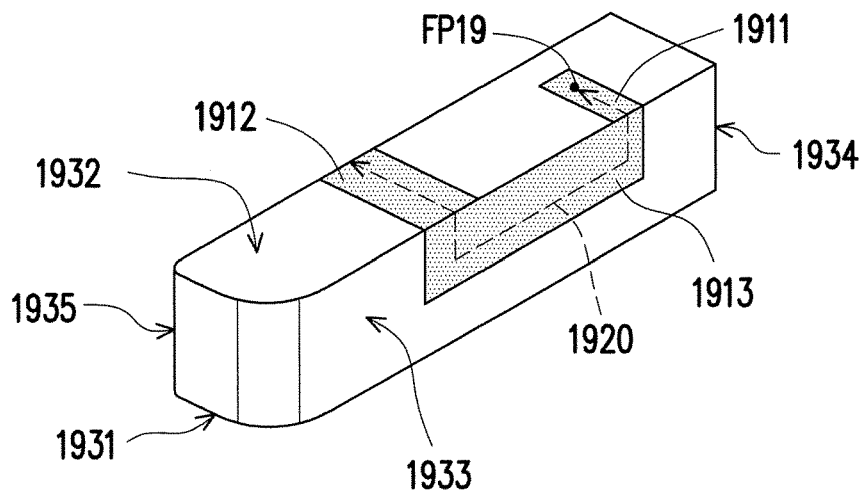
FIG. 19A to FIG. 19C are perspective schematic diagrams respectively illustrating a feeding element and a substrate of FIG. 17.
Figure 19B:
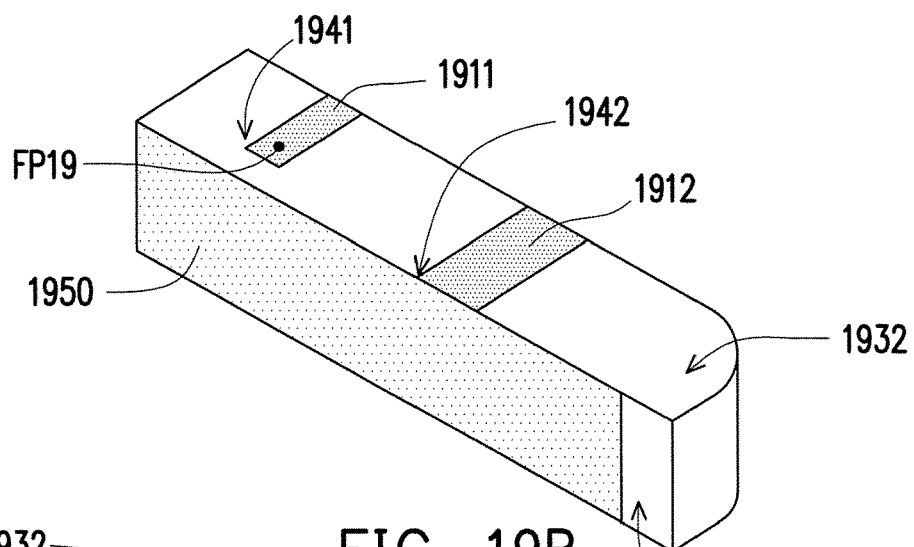
Figure 19C:
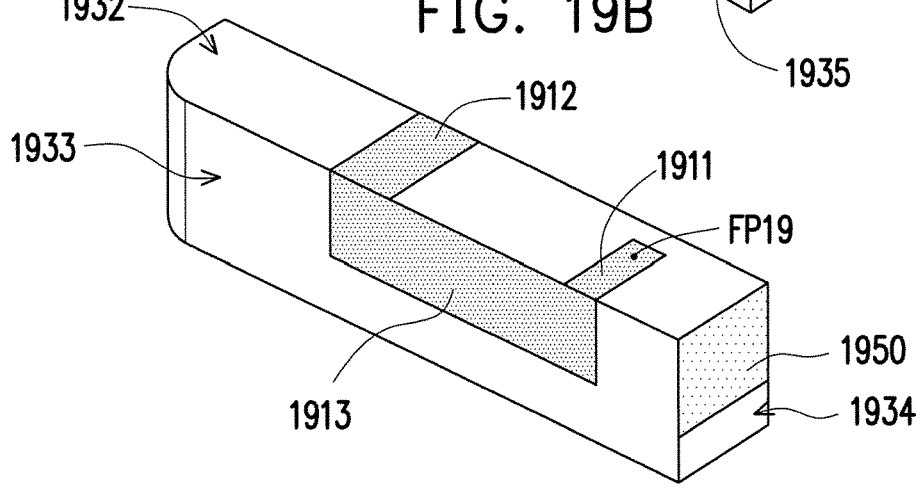

FIG. 18 is an enlarged schematic diagram illustrating a region A in FIG. 17 and mainly illustrates the metal back cover 1740, the insulating element 1750, the metal housing 1760, the feeding element 1770, and the substrate 1780 in the region A. FIG. 19A to FIG. 19C are perspective schematic diagrams respectively illustrating the feeding element and the substrate of FIG. 17. As shown in FIG. 18 and FIG. 19A, the antenna structure 1800 in the electronic device 1700 includes the feeding element 1770, the substrate 1780, the metal back cover 1740, and the metal housing 1760. Moreover, an open slot 1810 is formed between the metal back cover 1740 and the metal housing 1760. In other words, the metal back cover 1740 and the metal housing 1760 are equivalent to the metal element having the open slot 1810 in the antenna structure 1800. The feeding element 1770 includes a first segment 1911, a second segment 1912, and a third segment 1913. The substrate 1780 includes a first surface 1931 and a second surface 1932 opposite to each other, and the substrate 1780 further includes a third surface 1933, a fourth surface 1934, and a fifth surface 1935 adjacent to the first surface 1931 and the second surface 1932.

The first segment 1911, the third segment 1913, and the second segment 1912 form a second resonant path 1920. Moreover, the first segment 1911 and the second segment 1912 are disposed on the second surface 1932, and the third segment 1913 is disposed on the third surface 1933. In other words, the feeding element 1770 is stacked above the open slot 1810 through the substrate 1780. In addition, the relative positions of the feeding element 1770 and the open slot 1810 are similar to the relative projection positions of the feeding element 120 and the open slot 150 in the embodiment of FIG. 1, and the main difference between the two lies in that the third segment 1913 of the feeding element 1770 is disposed on the third surface 1933 to thereby enhance the amount of coupling between the feeding element 1770 and the open slot 1810.

As shown in FIG. 19B and FIG. 19C, the fourth surface 1934 and the fifth surface 1935 of the substrate 1780 are disposed with a connection element 1950. The first segment 1911 has a feeding point FP19 and may be used to form a feeding end 1941 of the feeding element 1770. The second segment 1912 is electrically connected to the metal back cover 1740 through the connection element 1950 and may be used to form a shorting end 1942 of the feeding element 1770. In operation, similar to the embodiment of FIG. 1, the feeding element 1770 may be used to excite an open slot antenna formed by the open slot 1810, and the feeding element 1770 may be further used to constitute a loop antenna. Accordingly, the antenna structure 1800 covers the first band and the second band. The detailed configurations and operations of the components in the embodiment of FIG. 17 are already included in the foregoing embodiments and are thus not repeatedly described here.

Figure 20:
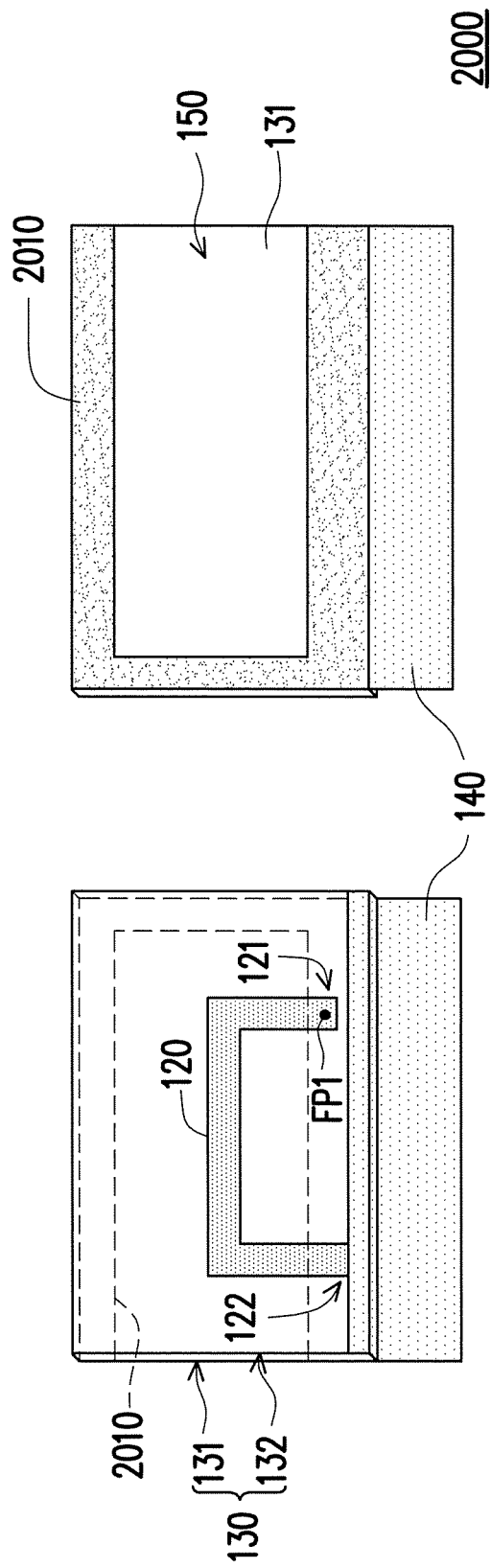
FIG. 20 is a perspective schematic diagram illustrating an antenna structure according to another embodiment of the invention.

It shall be noted that the metal element 110 in the foregoing antenna structures may also be directly disposed on the first surface 131 of the substrate 130, and the antenna structures may also be directly attached to an insulating structure of various electronic devices. For example, FIG. 20 is a perspective schematic diagram illustrating an antenna structure according to another embodiment of the invention, wherein a left half of FIG. 20 is a perspective schematic diagram illustrating a front view of an antenna structure 2000, and a right half of FIG. 20 is a perspective schematic diagram illustrating a rear view of the antenna structure 2000. As shown in FIG. 20, a metal element 2010 in the antenna structure 2000 is disposed on the first surface 131 of the substrate 130. Moreover, similar to the embodiment of FIG. 1, the metal element 2010 has an open slot 150, and the second surface 132 of the substrate 130 is disposed with the feeding element 120. The detailed configurations and operations of the components in the embodiment of FIG. 20 are already included in the embodiment of FIG. 1 and are thus not repeatedly described here. It shall be mentioned that the antenna structure 2000 may be directly attached to an insulating structure of the electronic device. For example, the antenna structure 2000 may be directly attached to the insulating housing 1040 of the hinge structure 1030 of FIG. 10.

In summary of the above, the antenna structure of the invention may form the open slot antenna by using the open slot in the metal element to thereby cover the first band. Moreover, the antenna structure may further form the loop antenna by using the feeding element of the open slot antenna to thereby cover the second band. Accordingly, the antenna structure has a characteristic of multi-band operation, and the electronic device may support multiple wireless communication protocols. In addition, since the antenna structure directly uses the open slot and the feeding element disposed on the open slot to form the two resonant paths, such configuration contributes to reducing the size of the antenna structure, and thereby the antenna structure may meet the thinness design needs of electronic devices. Furthermore, in an embodiment, the metal element in the antenna structure may be formed by the metal back cover of the electronic device, the metal housing of the hinge structure, or a combination thereof. In another embodiment, the metal element and the feeding element in the antenna structure may also be disposed both on the substrate, and the antenna structure may also be directly attached to the insulating structure of the electronic device.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. An antenna structure comprising:
   a metal element having an open slot, the open slot forming a first resonant path;
   a substrate disposed on the metal element; and
   a feeding element disposed on the substrate, wherein the metal element and the feeding element are respectively disposed on two opposite sides of the substrate, and the feeding element comprises:
   a feeding end; and
   a shorting end electrically connected to the metal element, wherein an orthogonal projection of the feeding element on the metal element is partially overlapped with the open slot without crossing two opposite sides of the open slot, and the feeding element forms a second resonant path extending from the feeding end to the shorting end,
   wherein the antenna structure operates in a first band through the first resonant path and operates in a second band through the second resonant path.

2. The antenna structure according to claim 1, wherein the antenna structure further comprises a connection element, and the shorting end of the feeding element is electrically connected to the metal element through the connection element.

3. The antenna structure according to claim 1, wherein a length of the first resonant path is a quarter of a wavelength of the first band.

4. The antenna structure according to claim 1, wherein a length of the second resonant path is a half of a wavelength of the second band.

5. The antenna structure according to claim 1, wherein the open slot has a closed end, an open end, and a first edge, the first edge is located between the closed end and the open end, a portion of the orthogonal projection corresponding to the feeding end of the feeding element is close to the closed end, and a portion of the orthogonal projection corresponding to the shorting end of the feeding element is close to the first edge.

6. The antenna structure according to claim 5, wherein the feeding element comprises:
a first segment comprising the feeding end;
a second segment comprising the shorting end; and
a third segment electrically connected between the first segment and the second segment, the first segment, the third segment, and the second segment forming the second resonant path.

7. The antenna structure according to claim 6, wherein portions of the orthogonal projection respectively corresponding to the first segment and the second segment are partially overlapped with the first edge of the open slot, and a portion of the orthogonal projection corresponding to the third segment is located in the open slot.

8. The antenna structure according to claim 7, wherein the feeding element further comprises:
a first extended segment, wherein a first end of the first extended segment is electrically connected to a first end of the third segment, and a portion of the orthogonal projection corresponding to a second end of the first extended segment extends toward the closed end of the open slot.

9. The antenna structure according to claim 8, wherein the feeding element further comprises:
a second extended segment, wherein a first end of the second extended segment is electrically connected to a second end of the third segment, and a portion of the orthogonal projection corresponding to a second end of the second extended segment extends toward the open end of the open slot.

10. The antenna structure according to claim 7, wherein the open slot further has a second edge opposite to the first edge, and the feeding element further comprises:
an extended segment, wherein a first end of the extended segment is electrically connected to the third segment, and a portion of the orthogonal projection corresponding to a second end of the extended segment extends toward the second edge of the open slot.

11. The antenna structure according to claim 6, wherein portions of the orthogonal projection respectively corresponding to the first segment, the second segment, and the third segment are located in the open slot.

12. The antenna structure according to claim 6, wherein portions of the orthogonal projection respectively corresponding to the first segment and the second segment are partially overlapped with the closed end of the open slot, and a portion of the orthogonal projection corresponding to the third segment is located in the open slot.

13. The antenna structure according to claim 6, wherein the substrate comprises a first surface and a second surface opposite to each other, the first surface is disposed on the metal element, and the first segment, the third segment, and the second segment are disposed on the second surface.

14. The antenna structure according to claim 13, wherein the antenna structure is applicable to an electronic device, and the electronic device comprises:
a hinge structure comprising a metal housing, wherein the metal housing is configured to constitute the metal element of the antenna structure, and the open slot is disposed on the metal housing; and
a first body and a second body, rotating relatively to each other through the hinge structure.

15. The antenna structure according to claim 14, wherein the hinge structure further comprises:
a pivot base;
a first rotating shaft pivoted to the pivot base and fixed to the first body; and
a second rotating shaft pivoted to the pivot base and fixed to the second body.

16. The antenna structure according to claim 14, wherein the hinge structure further comprises a hinge assembly, and the hinge assembly comprises:
a first bracket fixed to the first body;
a second bracket fixed to the second body; and
a connection bracket pivoted to the first bracket and the second bracket.

17. The antenna structure according to claim 6, wherein the substrate comprises a first surface, a second surface, and a third surface, the first surface and the second surface are opposite to each other, the third surface is adjacent to the first surface and the second surface, the first surface is disposed on the metal element, the first segment and the second segment are disposed on the second surface, and the third segment is disposed on the third surface.

18. The antenna structure according to claim 17, wherein the antenna structure is applicable to an electronic device, and the electronic device comprises:
a hinge structure comprising a metal housing; and
a first body and a second body, rotating relatively to each other through the hinge structure, the second body comprising a metal back cover, wherein the metal housing and the metal back cover are configured to constitute the metal element of the antenna structure.

19. The antenna structure according to claim 6, wherein the substrate comprises a first surface and a second surface opposite to each other, the metal element is disposed on the first surface, and the first segment, the third segment, and the second segment are disposed on the second surface.

20. The antenna structure according to claim 19, wherein the antenna structure is applicable to an electronic device, and the antenna structure is attached to an insulating structure of the electronic device.

* * * * *